US009582771B2

United States Patent
Perez-Mercader et al.

(10) Patent No.: US 9,582,771 B2
(45) Date of Patent: Feb. 28, 2017

(54) CHEMICALLY-OPERATED TURING MACHINE

(71) Applicants: PRESIDENT AND FELLOWS OF HARVARD COLLEGE, Cambridge, MA (US); Repsol SA, Madrid (ES)

(72) Inventors: Juan Perez-Mercader, Cambridge, MA (US); Marta Dueñas-Diez, Cambridge, MA (US); Daniel Case, Cambridge, MA (US)

(73) Assignees: PRESIDENT AND FELLOWS OF HARVARD COLLEGE, Cambridge, MA (US); REPSOL SA, Madrid (ES)

( * ) Notice: Subject to any disclaimer, the term of this patent is extended or adjusted under 35 U.S.C. 154(b) by 363 days.

(21) Appl. No.: 13/739,332

(22) Filed: Jan. 11, 2013

(65) Prior Publication Data

US 2014/0200716 A1    Jul. 17, 2014

(51) Int. Cl.
| | |
|---|---|
| G06N 99/00 | (2010.01) |
| G05B 11/01 | (2006.01) |
| G06N 3/00 | (2006.01) |
| B82Y 10/00 | (2011.01) |

(52) U.S. Cl.
CPC ............ G06N 99/007 (2013.01); B82Y 10/00 (2013.01); G05B 11/01 (2013.01); G06N 3/002 (2013.01)

(58) Field of Classification Search
CPC .................................................. G06N 99/007
See application file for complete search history.

(56) References Cited

U.S. PATENT DOCUMENTS

| | | | | | |
|---|---|---|---|---|---|
| 3,295,112 | A | * | 12/1966 | Stewart | 365/153 |
| 3,730,685 | A | * | 5/1973 | Prohaska | 436/51 |
| 5,108,703 | A | * | 4/1992 | Pfost et al. | 422/65 |
| 5,280,424 | A | * | 1/1994 | Rony et al. | 700/28 |
| 6,824,742 | B1 | * | 11/2004 | Inoue | 422/116 |

(Continued)

FOREIGN PATENT DOCUMENTS

WO    WO-2014108485 A1    7/2014

OTHER PUBLICATIONS

Agladze, K., Obata, S. & Yoshikawa, K. Phase-shift as a basis of image processing in oscillating chemical medium. Physica D: Nonlinear Phenomena 84, 238-245 (1995).*

(Continued)

*Primary Examiner* — Soren Harward
(74) *Attorney, Agent, or Firm* — Schwegman Lundberg & Woessner, P.A.

(57) ABSTRACT

The present disclosure relates to a Turing machine having a reactor comprising a reactant solution comprising a reactant; a first chemical species source to provide a selected amount of a first chemical species; a second chemical species source to provide a selected amount of a second chemical species; one or more controllers coupled to control the addition of the first and second chemical species from the first and second chemical species sources responsive to an input; and a sensor positioned to sense changes in the reactant as the controller controls the first and second chemical species sources to add selected amounts of the respective first and second chemical species to the reactor. The controller receives signals corresponding to the state of the reactant and correlates the states of the reactant to a result that is computed as a function of the input.

18 Claims, 7 Drawing Sheets

(56) References Cited

U.S. PATENT DOCUMENTS

| | | | |
|---|---|---|---|
| 2009/0124506 A1* | 5/2009 | Keinan | 506/7 |
| 2015/0346736 A1 | 12/2015 | Perez-mercader et al. | |

OTHER PUBLICATIONS

Bolletta, F. & Balzani, V. Oscillating chemiluminescence from the reduction of bromate by malonic acid catalyzed by tris(2,2'-bipyridine)ruthenium(II). Journal of the American Chemical Society 104, 4250-4251 (1982).*
Evans, D. Introduction to Computing: Explorations in Language, Logic, and Machines. (2010). Excerpt of pp. 119-122.*
Gorecki, J., Gorecka, J. N., Igarashi, Y. & Yoshikawa, K. Information Processing with Structured Chemical Excitable Medium. in Natural Computing (Suzuki, Y., Hagiya, M., Umeo, H. & Adamatzky, A.) 48-69 (Springer Japan, 2009).*
Holley, J., Adamatzky, A., Bull, L., De Lacy Costello, B. & Jahan, I. Computational modalities of Belousov-Zhabotinsky encapsulated vesicles. Nano Communication Networks 2, 50-61 (2011).*
Körös E., Ladányi, L., Friedrich, V., Nagy, Z. & Kis, Á. The Ru(dipy) 3 2+ -Bromate-Malonic acid oscillating system. Reaction Kinetics and Catalysis Letters 1, 455-460 (1974).*
Liekens, A. M. L. & Fernando, C. T. Turing complete catalytic particle computers. in Advances in Artificial Life (Almeida e Costa, F., Rocha, L. M., Costa, E., Harvey, I. & Coutinho, A.) 1202-1211 (Springer Berlin Heidelberg, 2007).*
Szacilowski, K. Digital Information Processing in Molecular Systems. Chemical Reviews 108, 3481-3548 (2008).*
Samoilov, M., Arkin, A. & Ross, J. Signal Processing by Simple Chemical Systems. The Journal of Physical Chemistry A 106, 10205-10221 (2002).*
Bollt, E. M. & Dolnik, M. Encoding information in chemical chaos by controlling symbolic dynamics. Physical Review E 55, 6404-6413 (1997).*
Petrov, V., Gáspár, V., Masere, J. & Showalter, K. Controlling chaos in the Belousov—Zhabotinsky reaction. Nature 361, 240-243 (1993).*
Adamatzky, A., Costello, B. D. L. & Asai, T. Reaction—Diffusion Computers. (Elsevier B.V., 2005). Excerpt of chapters 1 and 3.*
Sielewiesiuk, J. & Górecki, J. Logical functions of a cross junction of excitable chemical media. Journal of Physical Chemistry A 105, 8189-8195 (2001).*
Steinbock, O., Kettunen, P. & Showalter, K. Chemical Wave Logic Gates. The Journal of Physical Chemistry 100, 18970-18975 (1996).*
"Chemical Programming of Self-Organizing Systems", [online]. [retrieved on Jan. 9, 2013]. Retrieved from the Internet: <URL: http://www.ercim.eu/publication/Ercim_News/enw64/banatre.html>, (2013), 2 pgs.
"Online Shop Cookies Contact us Advanced Search", [online]. [retrieved on Jan. 9, 2013]. Retrieved from the Internet: <URL: http://www.rsc.org/chemistryworld/News/2005/November/28110501.asp>, (2005), 1 pg.
"Online Shop Cookies Contact us Advanced search", [online]. [retrieved on Jan. 9, 2013]. Retrieved from the Internet: <URL: http://www.rsc.org/chemistryworld/news/2007/january/24010701.asp>, (2007), 2 pgs.
"The Fundamental Physical Limits of Computation", [online]. [retrieved on Jan. 9, 2013], Retrieved from the Internet: <URL: http://escoladeredes.net/profiles/blogs/the-fundamental-physical>, 6 pgs, Jul. 1985.
Adamatzky, A. "Designing a chemical computer", FET Proactive Initiative: Bio-chemistry based Information Technology, (2012), 3 pgs.
Angione, C., et al., "Computing with Metabolic Machines", Turing-100 The Alan Turing Centenary, (2012), 15 pgs.
Aron, J., "Chemical computers solve shapely puzzles", One Per Cent, (Apr. 19, 2011), 2 pgs.
Banatre, J.-P., et al., "Higher-order Chemical Programming Style", Proceedings of the 2004 International Conference on Unconventional Programming Paradigms (UPP'04), (2004), 10 pgs.
Banatre, J.-P., et al., "Principles of Chemical Programming", Rule 2004 Preliminary Version, (2004), 1-14.
Benenson, Y., et al., "Molecular Computing Machines", Dekker Encyclopedia of Nanoscience and Nanotechnology, (2004), 2043-2055.
Bennett, C. H., "Logical Reversibility of Computation", IBM J. R & D., 44, (Nov. 1973), 525-532.
Bennett, C. H., "Notes on the history of reversible computation", IBM J. R & D., 44, (2000), 270-277.
Bennett, C. H., et al., "Quantum Information Theory", IEEE Transactions on Information Theory, 44(6), (1998), 2724-2742.
Bennett, C. H., "The Thermodynamics of Computation—A Review", International Journal of Theoretical Physics, 21(12), (1982), 905-940.
Bianco, L., et al., "Chapter 3—P Systems for Biological Dynamics", Applications of Membrane Computing, (2006), 81-126.
Chen, H.-L., et al., "Deterministic Function Computation with Chemical Reaction Networks", arXiv:1204.4176, (2012), 15 pgs.
Cook, M., et al., "Programmability of Chemical Reaction Networks", Natural Computing Series, (2009), 1-45.
De Lacy Costello, B., "Towards constructing one-bit binary adder in excitable chemical medium", (Abstract Only), Chemical Physics, 381(1-3), (2011), 1 pg.
Forbes, G. W., et al., "Measures of spread for periodic distributions and the associated uncertainty relations", Am. J. Phys. 69(3), (2001), 340-347.
Frank, D. J., "Comparison of High Speed Voltage-Scaled Conventional and Adiabatic Circuits", ISLPED, (1996), 377-380.
Hjelmfelt, A., et al., "Chemical implementation of finite-state machines", Proc. Natl. Acad. Sci. USA, 89, (Jan. 1992), 383-387.
Hjelmfelt. A., et al., "Chemical implementation of neural networks and Turing machines", Proc. Natl. Acad. Sci. USA, (Dec. 1991), 10983-10987.
Israel, D., et al., "What is Information?", University of Albany, (2008), 1-15.
Kharam, A., et al., "Binary Counting With Chemical Reactions", Pac. Symp. Biocomput., (2011), 12 pgs.
Kirkilionis, M., "Exploration of cellular reaction systems", Briefings in Bioinformatics, vol. II, No. 1, (2010), 153-178.
Landauer, R., "Energy requirements in communication", Appl. Phys. Lett., 51, (1987), 2056-2058.
Landauer, R., "Irreversibility and Heat Generation in the Computing Process", IBM Journal R & D, (Jul. 1961), 183-192.
Muggleton, S. H., "Exceeding human limits", Nature, 440, (Mar. 2006), 409-410.
Muggleton, S., "Towards Chemical Universal Turing Machines", 21st National Conference on Artificial Intelligence, (2006), 3 pgs.
Senum, P., et al., "Rate-Independent Constructs for Chemical Computation", Pacific Symposium on Biocomputing, (2011), 12 pgs.
Shannon, C. E., "A Mathematical Theory of Communication", The Bell System Technical Journal, 27, (1948), 55 pgs.
Soloveichik, D., et al., "Computation With Finite Stochastic Chemical Reaction Networks", Natural Computing, 7(4), (2008), 1-19.
Soloveichik, D., "Molecules Computing: Self-Assembled Nanostructures, Molecular Automata, and Chemical Reaction Networks", Thesis, in Partial Fulfillment of the Requirements for the Degree of Philosophy, California Institute of Technology, Pasadena, CA, (2008), 133 pgs.
Styer, D. F., et al., "Insight into entropy", Am. J. Phy., 68(12), (2000), 1090-1096.
Zenil, H., "Turing Patterns with Turing Machines: Emergence and Low-level Structure Formation", arXiv:1210.1572v1, (2012), 1-27.
"U.S. Appl. No. 14/760,172, Preliminary Amendment filed Jul. 9, 2015", 6 pgs.
"International Application Serial No. PCT/EP2014/050350, International Search Report mailed Apr. 2, 2014", 3 pgs.
Amemiya, Takashi, et al., "Experimental and Model Studies of Oscillations, Photoinduced Transitions, and Steady States in the

(56) References Cited

OTHER PUBLICATIONS

Ru(bpy)32+-Catalyzed Belousov-Zhabotinsky Reaction under Different Solute Compositions", J. Phys. Chem. A, 106(4), (2002), 612-620.
Hjelmfelt, A., et al., "Pattern Recognition in Coupled Chemical Kinetic Systems", Science, 260(5106), (Apr. 16, 1993), 335-337.
Lebender, D., et al., "Logical Gates Using a Nonlinear Chemical Reaction", Journal of Physical Chemistry, 98(31), (Aug. 4, 1994), 7533-7537.
Lloyd, Seth, "Any nonlinear gate, with linear gates, suffices for computation", Phys. Lett. A, 167(3), (1992), 255-260.
Matsumaru, N., "Chemical Programming to Exploit Chemical Reaction Systems for Computation", Dissertation, Department of Mathematics and Computer Science, Friedrich-Schiller-University Jena, (Aug. 28, 1974), 141 pgs.

\* cited by examiner

CHEMICALLY-OPERATED TURING MACHINE

FIELD OF INVENTION

The present disclosure relates to a chemically-operated Turing machine.

BACKGROUND

The universal Turing machine was devised in 1936 by Alan Turing. It was intended to mimic the pencil-and-paper operations of a mathematician. A Turing machine is a model of computation, or a way of representing and performing a given computation by means of some algorithm which is also known as the machine's "procedure." Turing machines are mathematically and logically equivalent to many other models of computation, such as cellular automata, neural networks, and digital computers. Because no model of computation is more powerful than a Turing machine, it is considered to embody what is meant when a problem is referred to as being "computable". In other words, anything for which an algorithm can be written, can be computed by a Turing machine. Turing machines have facilitated the proof of many important ideas and theorems regarding the nature and limits of computation, such as the undecidability of the halting problem and the existence of uncomputable functions.

While a Turing machine may be constructed to implement any specific algorithm imaginable, it is impractical to build a physical machine to solve each new problem. Fortunately, Turing machines can be constructed that take as an input a description and data tape from another Turing machine, and simulate that Turing machine on its own tape. Such a Turing machine is known as a Universal Turing Machine (UTM). Personal computers are good approximations of Universal Turing Machines, in that the programs that they run are descriptions of specific algorithms and hence, specific Turing machines. Personal computers fall short of UTMs, however, because their memory cannot be expanded every time more storage is needed. There is therefore a need in the art for Turing machines that overcome the shortcomings of, e.g., personal computers, and more closely approximate a UTM.

SUMMARY

A first aspect of the invention is a Turing machine based on an oscillatory chemical reaction which comprises a reactor comprising a reactant solution comprising a reactant; a first chemical species source to provide a selected amount of a first chemical species; a second chemical species source to provide a selected amount of a second chemical species; one or more controllers coupled to control the addition of the first and second chemical species from the first and second chemical species sources responsive to an input; and one or more sensors positioned to sense changes in the reactant as the controller controls the first and second chemical species sources to add selected amounts of the respective first and second chemical species to the reactor, wherein the controller receives signals corresponding to the state of the reactant and correlates the states of the reactant to a result that is computed as a function of the input.

A second aspect of the invention is the Turing machine as defined in the first aspect further comprising a tape to provide the input to the controller.

A third aspect of the invention is the Turing machine as defined in any of the previous aspects, wherein the one or more sensors of comprises a redox sensor, a pH sensor, a temperature sensor, a pressure sensor, a UV-Vis sensor or combinations thereof.

A fourth aspect of the invention is the Turing machine as defined in any of the previous aspects, wherein the first chemical species comprises a reducing agent solution and the second chemical species comprises an oxidizing agent solution.

A fifth aspect of the invention is the Turing machine of the forth aspect wherein the reducing agent is malonic acid.

A sixth aspect of the invention is the Turing machine as defined in the forth aspect of the invention, wherein the oxidizing agent is bromate ions.

A seventh aspect of the invention is the Turing machine as defined in any of the previous aspects, wherein the reactor is a continuously stirred tank reactor.

A eighth aspect of the invention is the Turing machine as defined in any of the previous aspects, wherein the sensor comprises a spectrometer adapted to periodically detect color changes in the transition metal complex solution.

A ninth aspect of the invention is the Turing machine as defined in any of the previous aspects, wherein the first chemical species source and/or the second chemical species source comprise burettes.

A tenth aspect of the invention is the Turing machine as defined in any of the previous aspects, wherein the states of the reactant comprise meta stable states.

A eleventh aspect of the invention is the Turing machine as defined in any of the previous aspects, wherein the reactant comprises a transition metal complex.

A twelfth aspect of the invention is the Turing machine as defined in any of the previous aspects, wherein the transition metal complex is a ruthenium (II) complex, a ruthernium (III) complex, cerium (III) or a cerium (IV) complex.

A thirteenth aspect of the invention is the Turing machine as defined in the twelfth aspect of the invention, wherein the ruthenium (II) complex is a tris(bipyridine)ruthenium (II) complex.

A fourteenth aspect of the invention is the Turing machine as defined in any of the previous aspects, wherein, the input of the Turing machine as defined above comprises a parenthesis.

A fifteenth aspect of the invention is the Turing machine as defined in any of the previous aspects, wherein said Turing machine is a parenthesis checker.

A sixteenth aspect of the invention is the use of the Turing Machine, as defined in any of the previous aspects, as an element of the central processing unit of a programmable chemical computer.

A seventeenth aspect of the invention is a central processing unit of a programmable chemical computer comprising one or more Turing Machines, as defined in any of the previous aspects, or appropriate variants thereof.

An eighteenth aspect of the invention is a programmable chemical computer comprising a central processing unit which comprises one or more Turing Machines, as defined in any of the previous aspects, or appropriate variants thereof.

A nineteenth aspect of the invention is a method of operating a chemical Turing machine comprising providing a reactor comprising a reactant solution comprising a reactant; providing an input to a controller, coupled to control the addition of a first and a second chemical species from a first chemical species source and a second chemical species source, responsive to the input; and sensing changes in the reactor as the controller controls the first and second chemical species sources to add selected amounts of the respective first and second chemical species to the reactor, wherein the controller receives signals corresponding to the states of the reactant; and correlating the states of the reactant to a result that is computed as a function of the input.

DETAILED DESCRIPTION

Figure 1:
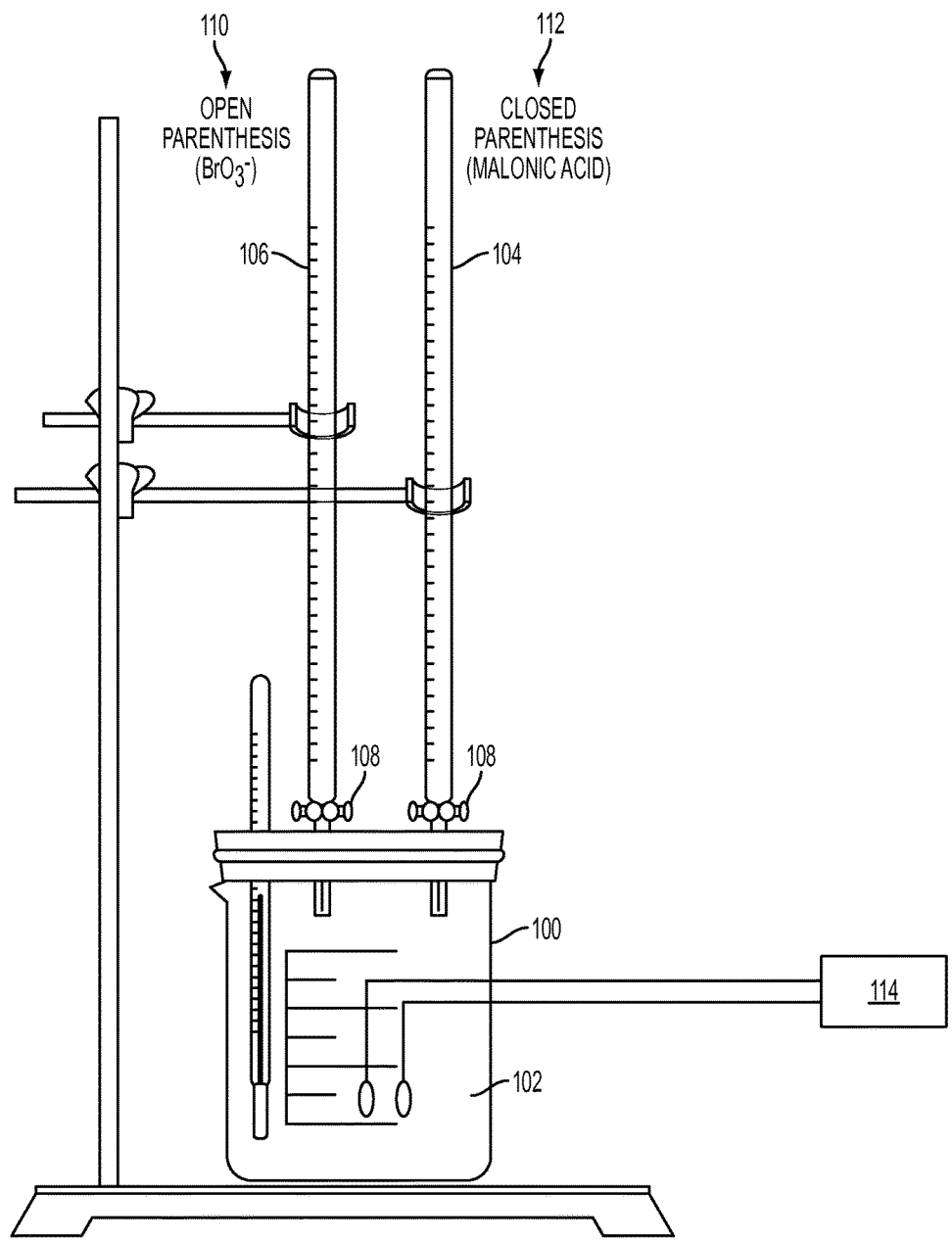
FIG. 1 is a schematic representation of a finite state machine (FSM) according to an example embodiment.

The disclosure presents the design, realization, and operation of embodiments of a chemically-operated Turing machine. In some embodiments, the chemically-operated Turing machine combines a potentially infinite input tape and a finite state machine (FSM) that uses chemical reactions. In some embodiments, once the information in the input tape has been fed into the chemically-operated Turing machine of the embodiments of the present invention, the chemically-operated Turing machine of the embodiments of the present invention uses chemical energy (i.e., chemical reactions) for all the features involved in its operation, including its logical state transitions, and does not require any mechanical, electrical, electronic or any other form of external intervention during the course of its operation.

In some embodiments, the finite state machine is based on the dynamics of the states of the well-known and extensively documented properties of the multistate semi-batch or batch (e.g., intermittent flow) or continuously-stirred tank reactor (CSTR) version of the Belousov/Zhabotinsky (B/Z) reaction. In this embodiment, the "alphabet" (e.g., a two-member alphabet or a two-letter alphabet) on which information is entered into the machine through the input tape is based on a two-letter or a two-symbol alphabet since it corresponds to the addition of two different chemical species. Depending on the specific order in which pre-determined amounts of two different chemical species are added to a reactor comprising a reactant solution comprising a reactant (e.g., in an aqueous solution), the B/Z reaction is driven into a finite number of discrete states. These states are then sensed/detected and can be interpreted as the result of the "computation" performed by the chemically-operated Turing machine in response to the particular ordered sequence of stimuli/inputs provided by the input tape. The energy source for the operation of the chemically-operated Turing machine is the chemical energy expended in the chemical reactions taking place during the computations.

In some embodiments, the "alphabet" on which information is entered in the input tape of the chemically-operated Turing machine described herein comprises an open parenthesis "(" and a closed parenthesis ")." In such embodiments, a chemically-operated Turing machine as described here can be configured as the basic "parentheses checker" to decide whether a sequence of open and closed parentheses is well-formed, i.e., if for every open parenthesis in the sequence there exists a corresponding closed parenthesis. In fact, the chemically-operated Turing machine is, in some embodiments, the chemical generalization of the generic canonical parenthesis checker constructed by Minsky in the 1950's. See, e.g., Minsky, M. L., *Computation: Finite and Infinite Machines*, Prentice Hall (1967). Minsky's machine is well known to be one of the simplest Turing machines. To date such machines have been constructed based on mechanics, electronics and, theoretically, using enzymes with known chemical properties, but their actual physical or chemical implementation from first principles has not been realized. Machines like Minsky's have never been designed and implemented using chemical means; that is, without making use of, or making any reference to, the chemistry of extant living systems and with full control by the designer over its functionality, operation, design and construction.

The chemically-operated Turing machine of the embodiments of the present invention is the practical realization of the concept of a chemical computation carried out in any inorganic (e.g., independent from extant life) system, and is based on an oscillatory chemical reaction. Its principles are general and can be extended, for example, to any inorganic-chemical system or any organometallic chemical system. The chemically-operated Turing machine of the embodiments of the present invention opens the way for the construction of chemically-based computers that are chemically programmed and chemically operated and have the ability to execute preprogrammed functions, carry out operations, and handle information in a completely autonomous manner. Such chemically-based computers may be capable of chemically responding to chemical stimuli in such a way that the result is an ordered chemical response, uniquely related to the stimuli on an input tape, that is the result of the implementation via chemistry of some effective procedure (i.e., an algorithm).

In some embodiments, the chemically-operated Turing machine is based on an oscillatory chemical reaction and comprises:

a reactor comprising a reactant solution comprising a reactant;

a first chemical species source to provide a selected amount of a first chemical species;

a second chemical species source to provide a selected amount of a second chemical species;

one or more controllers coupled to control the addition of the first and second chemical species from the first and second chemical species sources responsive to an input; and one or more sensors positioned to sense changes in the reactant as the controller controls the first and second chemical species sources to add selected amounts of the respective first and second chemical species to the reactor, wherein the controller receives signals corresponding to the state of the reactant and correlates the states of the reactant to a result that is computed as a function of the input.

As used herein, the term "reactant solution" includes, but is not limited to a reactant that is dissolved in a solvent (e.g., water). The reactant solution may also contain acids or co-solvents (e.g., dimethylformamide, dimethylsulfoxide or ethanol).

In some embodiments, the reactor comprising the reactant solution may be a semi-batch or batch (e.g., intermittent flow) or a continuously stirred tank reactor (CSTR) filled with the reactant solution. The reactor can be of any suitable size from picoliter size, to nanoliter size, to microliter size to multi-liter size to pilot-plant scale, and even industrialscale. Those of skill in the art will be able to determine the appropriate size of the reactor.

In some embodiments, the reactant solution is acidic. The reactant solution may be acidified using acid solutions (e.g., aqueous acid solutions) comprising sulfuric acid, nitric acid or any other equivalent strong inorganic acid or mixtures thereof.

In some embodiments, the reactant solution comprises at least one reactant which is a transition metal complex/catalyst. Transition metal complexes include, but are not limited to, ruthenium (II) complexes, ruthenium (III) complexes, cerium (III) complexes or cerium (IV) complexes. In some embodiments, the transition metal complex is a tris(bipyridine)ruthenium (II) complex. In other embodiments, the transition metal complex is ferroin-ferriin or other transition metal ions or complexes that possess at least two oxidation states differing in a single electron and that change the color of the solution when changing from one oxidation state to the other. Mixtures of any of these catalysts are also contemplated.

In some embodiments, the reactor comprising the reactant solution comprising the reactant may be equipped with a temperature controller. In some embodiments the temperature controller can maintain the temperature of the reactor to within ±1° C., such that the B/Z reaction may be carried out under isothermal conditions. In other embodiments, the reactor comprising the reactant solution may be equipped with a reduction-oxidation (red-ox) meter to monitor the red-ox potential within the reactor. In still other embodiments, the reactor comprising the reactant solution comprising the reactant is equipped with a spectrophotometer (e.g., a UV-Vis spectrophotometer) to determine changes in absorbance and absorbance intensity of the solution in the reactor. In some embodiments, absorbance measurements can be taken every 100 milliseconds, selected so that one can monitor the evolution of the chemical reactions as they approach their metastable states. This process can take several periods of oscillation of the B/Z reaction operating under certain conditions and therefore in about 100 seconds, about 1000 absorbance measurements can be taken.

In some embodiments, the first chemical species source can be a burette, a drop counter, a syringe pump or any means that could contain the first chemical species (e.g., a vesicle). In some embodiments, the first chemical species source can be a burette. In the case of a burette, the burette is equipped with a controller coupled to control the addition of the first chemical species from the first chemical species source in response to an input. In the context of a burette, the controller may be, in some embodiments, a stopcock. In some embodiments, the controller can also be a solenoid valve, microfluidic or chemically operated gel valves, or the like. In other embodiments, the controller may be any means by which the first chemical species can be released, including vesicles containing the first chemical species that would release (e.g., by rupturing) the first chemical species in response to an input.

The first chemical species source allows for the addition of discrete amounts of the first chemical species to the reactor comprising the reactant solution comprising the reactant. In some embodiments, the first chemical species comprises a reducing agent. Reducing agents include, but are not limited to, malonic acid, ascorbic acid, carbonic acid, citric acid, succinic acid or other suitable dicarboxylic acids, ketones or diketones, or mixtures thereof.

In some embodiments, the second chemical species source can be a burette, a drop counter, a syringe pump or any means that could contain the second chemical species (e.g., a vesicle). In some embodiments, the second chemical species source can be a burette. In the case of a burette, the burette is equipped with a controller coupled to control the addition of the second chemical species from the second chemical species source in response to an input. In the context of a burette, the controller may be, in some embodiments, a stopcock. In some embodiments, the controller can also be a solenoid valve, microfluidic or chemically operated gel valves, or the like. In other embodiments, the controller may be any means by which the second chemical species can be released, including vesicles containing the second chemical species that would release (e.g., by rupturing) the second chemical species in response to an input.

The second chemical species source allows for the addition of discrete amounts of the second chemical species to the reactor comprising the reactant solution comprising the reactant. In some embodiments, the second chemical species comprises an oxidizing agent. Oxidizing agents include, but are not limited to, oxidizing agents comprising bromate ($^-BrO_3$) ions, iodate ($^-IO_3$) ions, and the like. Oxidizing agents comprising bromate ions include, but are not limited to, lithium bromate, potassium bromate, sodium bromate, or any other soluble bromate salts of alkali metals and mixtures thereof.

The one or more sensors can be any type of sensor known in the art. In some embodiments, the one or more sensors can be a redox sensor, a pH sensor, a temperature sensor, a pressure sensor, a UV-Vis sensor or combinations thereof.

Those of skill in the art will recognize that there are many variants of the B/Z reaction, using different types of oxidizing agents, reducing agents and metal complexes. Hence it is contemplated that one can adapt the machine to handle different strings by building equivalent Turing machines with variants of the B/Z reaction.

Those of skill in the art will also recognize that changing the reactant solution comprising the reactant (e.g., by changing the reactant, including changing the transition metal complex/catalyst), the first chemical species, and/or the second chemical species may result in changes to the kinetic rates of one or several of the individual reactions in B/Z, changing, in turn, the oscillation characteristics. Accordingly, B/Z reaction variants can be explored in order to design a chemically-operated Turing machine with the desired response adapted to the available or desired monitoring possibilities.

As discussed in greater detail below, a chemically-operated Turing machine can also be achieved by changing the relative concentration of the first and second chemical species used to build an input tape, to the point where the solid form of the first and second chemical species, without dilution in a solvent, could be used. For example, crystals of the first chemical species and crystals of the second chemical species, adjusting for stoichiometry, may be used instead of a solution of the first chemical species and a solution of the second chemical species.

Even the definition of the input alphabet can be changed (e.g., bromate ions represent a closed parenthesis and malonic acid represents an open parenthesis). For any such chemically-operated Turing machines one could associate a nomograph (i.e., a pre-calibrated graph against which one compares the results of the computation taking place and the result being interpreted; see Examples) in which responses lying at any stage of computation below the nomograph are illogical.

The chemically-operated Turing machine of the embodiments of the present invention comprises a finite state machine (FSM) and an input tape. The FSM has, in some embodiments, five states plus an initial state and a final state. These five states are described in greater detail in the Examples provided herein. The FSM, however, can have more than five states plus an initial state and a final.

In some embodiments, the logical operation of the machine can be described by a set of four tapes and heads which, although not physical, help to capture and represent the specific features of the chemistry. The FSM is implemented as a reactor comprising a reactant that is ready to go into multiple states as soon as certain chemicals (i.e., the first and second chemical species) are added to the reactor. The calculations take place in the FSM upon introduction of a sequence of stimuli in the form of drops of either of two substances (i.e., the first chemical species and the second chemical species) corresponding to the two letters of a two symbol alphabet, viz., "(" and ")."

The sequence is contained in the input tape. When added to the reactant in the FSM, the chemistry has been designed in such a way that these stimuli to chemical reactions produce chemical results which, in turn, act as stimuli for subsequent states in the FSM. The results are the chemical result of the ensuing activity of the chemical reactions that constitute the five (plus initial) states of the FSM. These include oscillatory states, and the results are manifested by changes in the frequency of oscillation between colors and in the average intensity of their hues as they manifest in the reactant solution. These changes can be readily appreciated by the unaided eye or, in some embodiments, with a spectrophotometer.

In some embodiments, the FSM can take the form of a reactor 100 comprising a reactant solution 102, as shown in FIG. 1. See also, FIG. 4. A first chemical species source 104, in this case a first burette, is used to provide a selected amount of a first chemical species; in this case malonic acid. A second chemical species source 106, in this case a second burette, is used to provide a selected amount of a second chemical species, bromate ions. A controller 108, in this case a stopcock, one for source 104 and one for source 106, is coupled to control the addition of the first and second chemical species from the first chemical species source 104 and the second chemical species source 106, in response to an input. A sensor 114 (e.g., be a redox sensor, a pH sensor, a temperature sensor, a pressure sensor, a UV-Vis sensor or combinations thereof) can be positioned to sense changes in the reactant as the controller controls the first and second chemical species sources to add selected amounts of the respective first and second chemical species to the reactor, wherein the controller receives signals 110 (e.g., an open parenthesis) and 112 (e.g., a closed parenthesis) representing states of the reactants and correlates the states of the reactants to a result that is computed as a function of the input.

In the embodiment where the FSM is as shown in FIG. 1, the FSM, in its initial state (left-most panel) responds after an "open parenthesis" input (center panel) followed by a "close parenthesis" input (right-most panel). The Ru-(II) complex colors the FSM in its initial state (i.e., an orange hue of a given intensity) that changes to a first state (i.e., green hue of a given intensity) as the catalyst reacts and transforms into the Ru-(III) state. After the "closed parenthesis" input, the FSM initiates oscillations with a given frequency and the color oscillates between two specific intensities and hues.

In the embodiment where the FSM is a "parenthesis checker," the tape/FSM combination checks whether a sequence of open and closed parentheses "fed" to the Turing machine is matched. For example, the two sequences "(( )" and "( )( )(( ))" are matched, while the sequences "(( )(" and "((( )" are not matched. In the case where the parentheses are matched, the effective procedure executed by the FSM in the chemically-operated Turing machine will give a positive (e.g., logical) answer to the first group of two inputs. In the case where the parentheses are not matched, the effective procedure executed by the FSM in the chemically-operated Turing machine will give a negative (e.g., illogical) answer to the second group of two inputs. As used herein, the term "illogical" refers to an expression that does not make sense, relative to a sequence of matched open and close parentheses.

As can be seen from FIG. 1, the procedure implemented by the chemically-operated Turing machine of the embodiments of the present invention are general. Moreover, the chemically-operated Turing machine of the embodiments of the present invention can be built from readily available parts and chemical substances and requires no specialized equipment. In some specialized applications, however, ad hoc reactors and feed systems (i.e., chemical species sources) may have to be designed and built for example by embedding the components necessary to carry out the B/Z reaction in polymer beads (e.g., resin beads that are loaded with the reactant) to which the "alphabet letters," also known as the first and second chemical species, are fed, thus generating a large number of potential configurations, each of which could be programmed by the user/designer to execute some simple activity, while the ensemble leads to programmed emergent behavior, including in-phase oscillations and ensemble division, potentially leading to controlled self-replication) or within gels for which chemo-mechanical coupling takes place.

In reading the result of the operation of any Turing machine, including the chemically-operated Turing machine of the embodiments of the present invention, one needs an interface between the output of the machine and the user. For example, in standard Turing machines one interprets a "1" printed by a standard parentheses checker mechanical Turing machine on an output tape to mean that there is a "parentheses match," and a "0" to mean that "parentheses do not match." This interface is referred to herein as the nomograph for the Turing machine of some embodiments of the present invention and it is designed to allow the user to understand the result.

Examples of the Logical Operation of Embodiments of a Chemically Operated Turing Machine The implementation of a computation by an embodiment of the presently described chemically operated Turing machine including a generic chemical formula ("recipe") for its simple realization is described below. Also described, is an example of a monitoring system set-up; the logical structure of the tape; and the states and finite state machine representing the chemistry. These examples are set forth to assist in understanding the embodiments of the invention and should not, of course, be construed as specifically limiting the embodiments of the invention described and claimed herein.

The Computation

The computations carried out by the chemically-operated Turing machine through its states and tapes, implement an "effective procedure" described in greater detail below. The examples of computations are carried out by an embodiment that consists of a parenthesis checker (see below). The effective procedure was designed to capture the special requirements of the chemical reactions described herein and enables the chemically-operated Turing machine to generate "responses" that are easily identified by direct examination of the state of the reactor after a computation, using standard chemical instrumentation such as reference electrodes or a spectrophotometer.

These responses, $\{<\rho>, f\}$, obtained from the chemically-operated Turing machine of the embodiments of the present invention correspond directly to the quantity:

$$<\rho>=[Ru(III)]/([Ru(II)]+[Ru(III)])$$

and to the frequency f of oscillation between the two states [Ru(II)] and [Ru(III)] of a Ru-bpy that is involved in the B/Z reaction where lithium bormate represents "(" and malonic acid represents ")."

The computation is carried out in a stirred reactor, containing 100 mL of a solution with the concentrations shown in Table 1. The reactor is shielded from light to avoid interference in the calculated chemical kinetics of photo-sensitive reactions and is kept at a constant temperature of 25° C.

TABLE 1

Initial concentrations of reagents in the 100 mL reactor

| | |
|---|---|
| $H_2SO_4$ | 0.6M |
| $Ru(bpy)_3^{2+}$ | $0.24 \times 10^{-3}$M |
| NaBr | $1 \times 10^{-6}$M |
| $Ru(bpy)_3^{3+}$ | 0M |
| $BrO_3^-$ | 0M |
| Malonic acid | 0M |

The drop volumes used to "write" the input tape have the characteristics shown in Table 2.

TABLE 2

"Alphabet" droplets to build the input tape

| | $BrO_3^-$ | Malonic acid |
|---|---|---|
| Drop volume (mL) | 0.7 | 0.6 |
| Concentration (M) | 13.98 | 7.33 |

The highly concentrated bromate drops can be obtained from commercially available $LiBrO_3$. The lithium bromate and malonic acid dissolve in the reactor's solution to give a step change in the reactor's $BrO^{3-}$ concentration of 0.1M and in the reactor's malonic acid concentration of 0.045 M, respectively. These affect the extent of all reactions, hence modifying the chemical oscillation characteristics of both products as well as other specific properties of the reaction and changes the detailed properties of states of the FSM.

Figure 2:
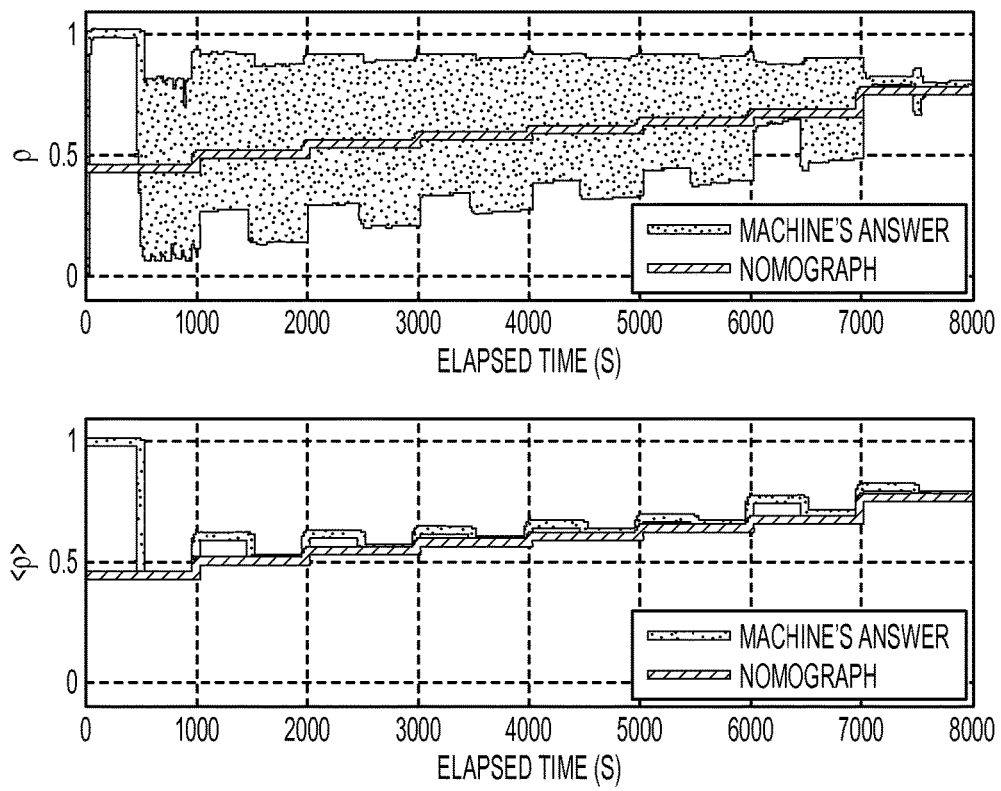
FIGS. 2 and 3 are nomographs (i.e., pre-calibrated graphs against which one compares the results of the computation taking place and the result being interpreted).

Using the reagents listed above in the proportions given in Tables 1 and 2, the reactor can do computations for a maximum of seven matched parentheses, as shown in FIG. 2. If more parentheses are entered, then the B/Z reaction network transitions to a steady-state regime, i.e., to a non-oscillatory regime.

A strategy to enable the computation of longer expressions without transition to a non-oscillatory regime, relies in changing the input "alphabet," in particular increasing the relative concentration of the malonic acid in the drops with respect to the bromate drops. One should keep in mind that if the concentrations are changed, the nomograph (to be described below) has to be recalibrated. But, for a given set of concentrations, the nomograph, once available, is unique and is valid for the interpretation of any expression to be tested.

Figure 3:
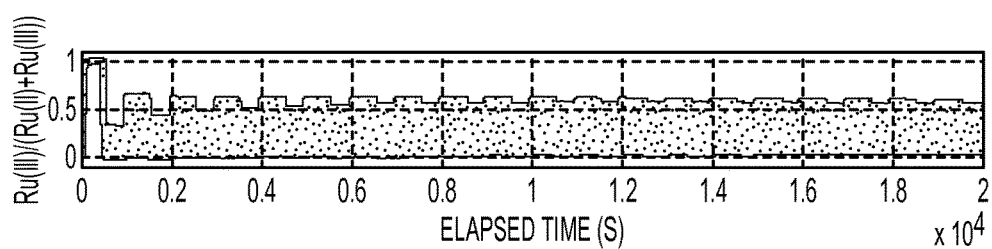

FIG. 3 shows an example in which the concentration of reagents in the drops has been changed so that when added to the reactor, the droplets dilute in the reactor's solution to give a step change in the reactor's $BrO^{3-}$ concentration of 0.045 M and in the reactor's malonic acid concentration of 0.1 M, respectively. As shown, the length of the input sequences that can be computed is considerably longer than in the previous example, but the monitoring equipment would require more precision in order to detect the relative changes in oscillation mean and frequency of oscillation that are smaller than those attained with the concentrations given in Table 2.

Standard laboratory equipment can be used to monitor the metal complex oscillations and the associated oscillations in the solution color that are the response of the chemically-operated Turing machine of the embodiments of the present invention. Typically, the redox potential and the color are monitored with the help of reference electrodes (e.g., Pt-working and a Ag-quasi reference electrode) connected to an electrometer and a spectrophotometer (e.g., monitoring absorption of 635 nm wavelength light), respectively. In embodiments where the B/Z reaction is a Ruthenium-catalyzed reaction, the chemical oscillations may be monitored using a system such as the one described below.

Figure 4:
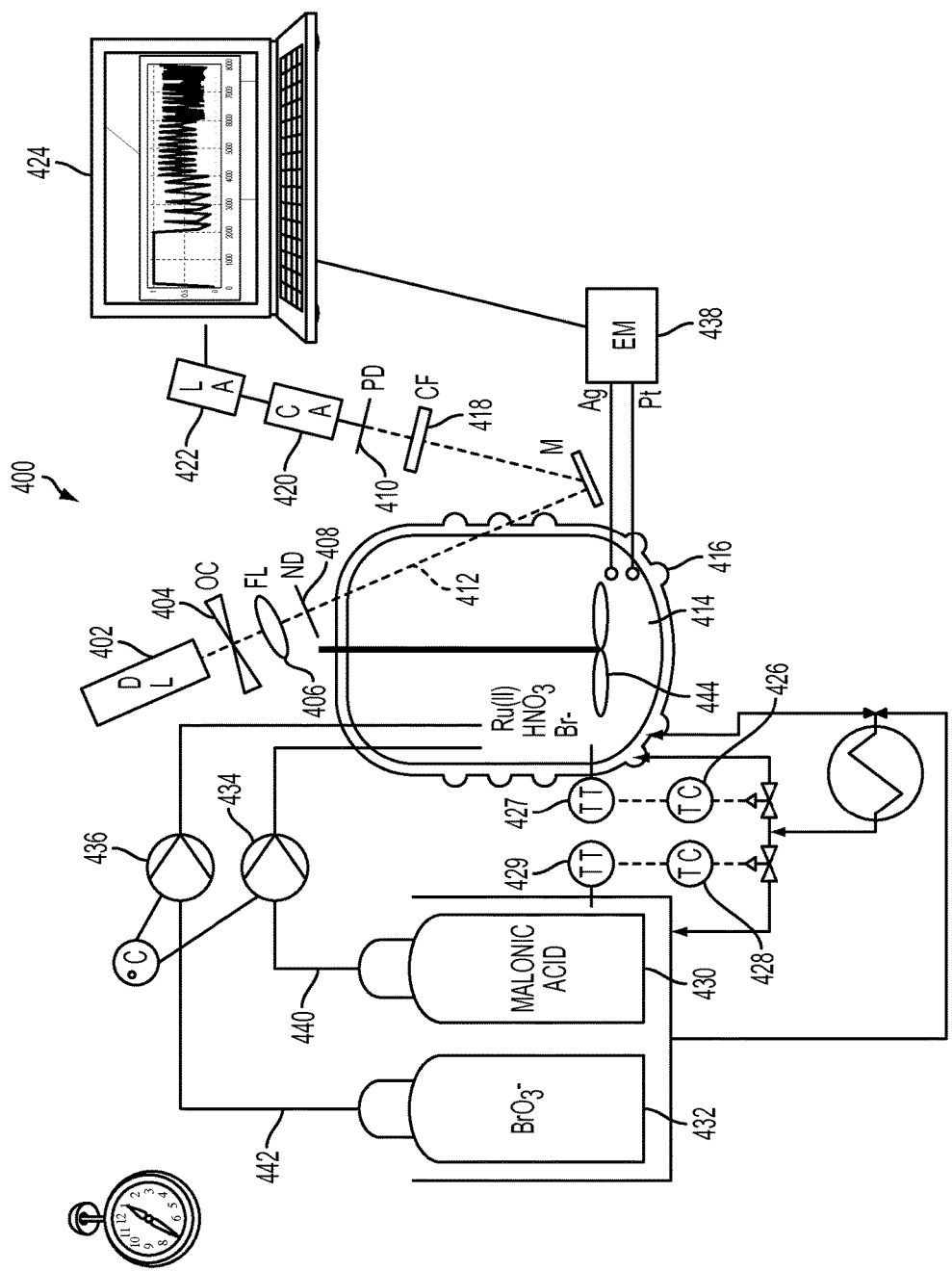
FIG. 4 is a schematic representation of an FSM according to an example embodiment.

An example of a monitoring system is shown in FIG. 4, which is a standard optical monitoring system and is available in the open literature. See, e.g., Amemiya, T et al., *J. Phys. Chem. A* 106: 612-620 (2002). This system 400 comprises a diode laser 402 (e.g., one emitting 635 nm wavelength light); an optical chopper 404 to modulate the laser beam; a focusing lens 406; a neutral density filter 408; a photodiode 410 to measure the intensity of the beam 412 (broken line) after passing through the solution 414 (comprising a metal complex and other reagents) comprised in reactor 416; a color filter 418; a current pre-amplifier 420 to amplify the photocurrent signal from the photodiode 410; a two-phase lock-in amplifier 422 to further amplify the signal; and a computer 424 to receive and interpret the signal. The monitoring system 400 also comprises temperature controller 426, connected to temperature transmitter 427, to control the temperature of the reactor 416; and temperature controller 428, connected to temperature transmitter 429, to control the temperature of the first and second chemical species sources 430 and 432, respectively. Finally, the monitoring system 400 comprises a pump controller 434 coupled to control the addition of malonic acid via conduit 440 (which is in fluid communication with first chemical species source 430 and reactor 416) and a pump controller 436 coupled to control the addition of bromate ions via conduit 442 (which is in fluid communication with second chemical species source 432 and reactor 416). In some embodiments, the monitoring system 400 also comprises an electrometer 438. In some embodiments, the system 400 also comprises a stirring mechanism 444 for stirring the solution 414.

The Logical Structure of the Tape and Finite State Machine Representing the Above Chemistry. Illustrated by Example 1, the Parenthesis String "( )( )" and by Example 2, the Parenthesis String "( )(("

The following example illustrates how the FSM/tape combination, which make up the chemically-operated Turing machine of the embodiments of the present invention work together. These examples describe the evolution of the various states (i.e., the five states) in the chemically-operated Turing machine of the embodiments of the present invention.

The above chemistry of the chemically-operated Turing machine of the embodiments of the present invention has a structure that is equivalent to at least the following logical components and states. Note that the heads and tapes (except for the input tape) are conceptual constructs whose role in the following is to describe the logical operation of embodiments of the chemically operated Turing machine of the embodiments of the invention.

The Logical Structure

Figure 5A:
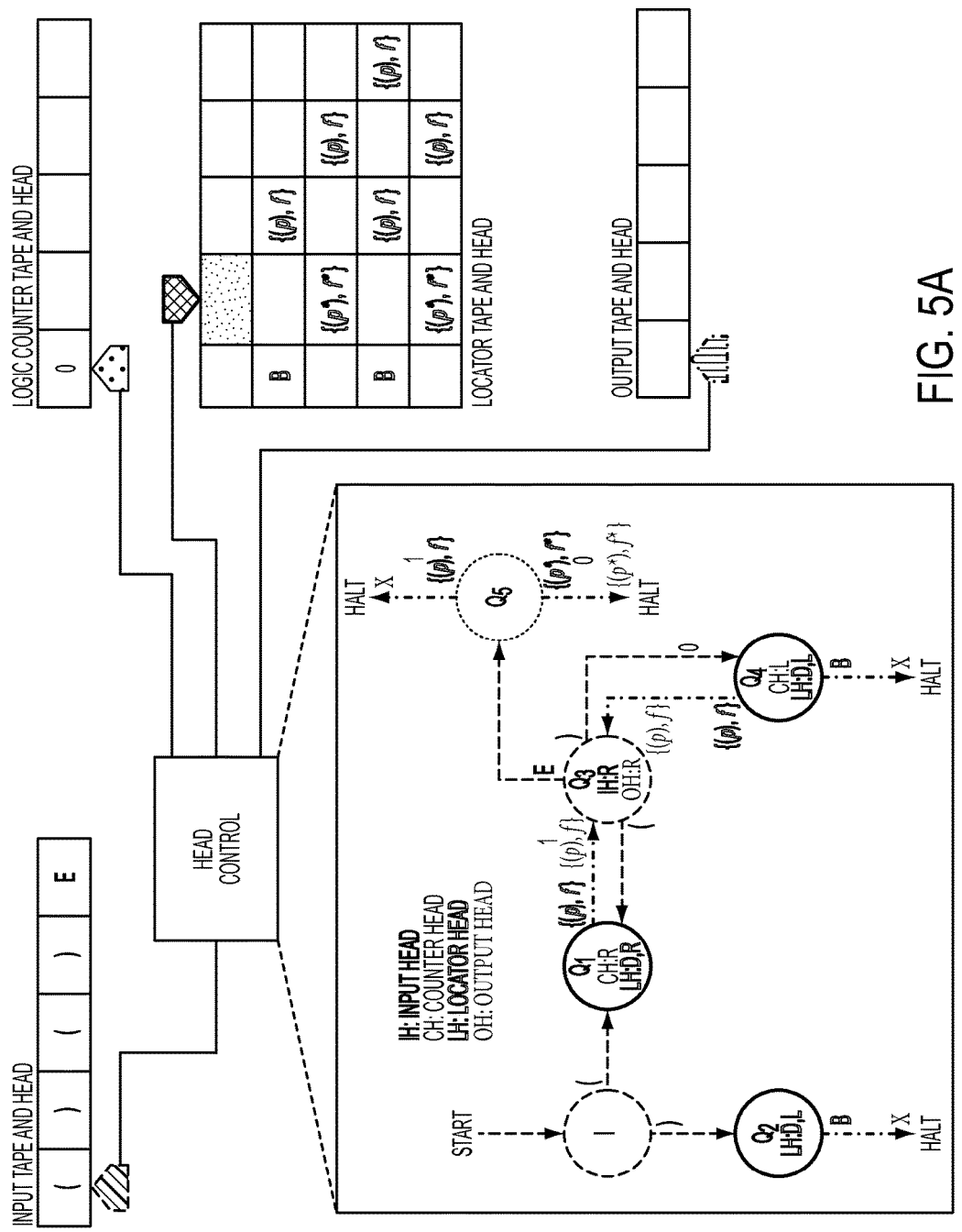
FIGS. 5A and 5B are standard schematic logical representations of a chemically-operated Turing machine of the embodiments of the present invention, including an input tape and head; a logic counter tape and head; a locator tape and head; and output tape and head.
Figure 5B:
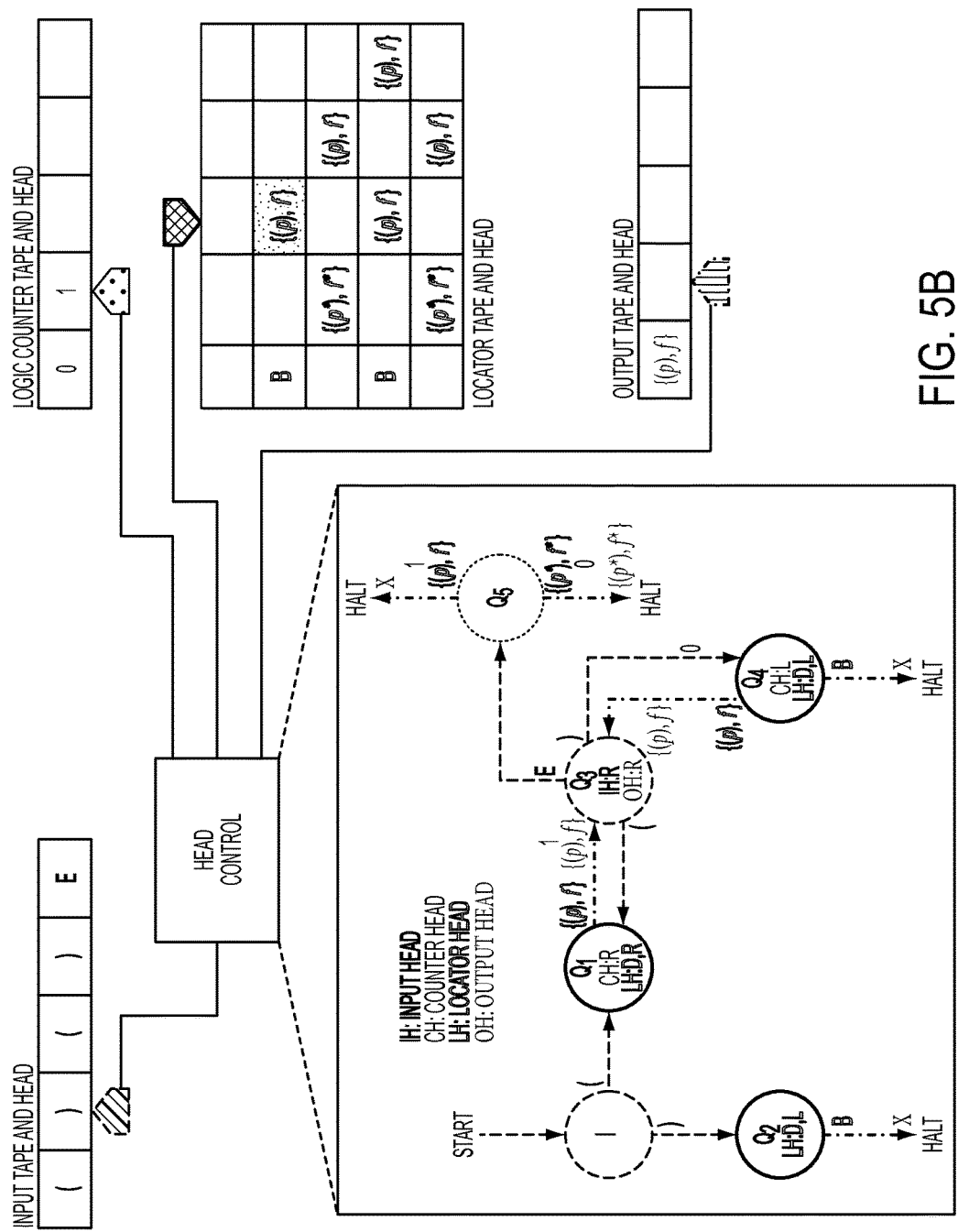

First, a brief description is provided of the components of the logical structure for the embodiments of the present invention. See FIGS. 5A and 5B.

INPUT TAPE AND INPUT HEAD: The input tape contains a string of parentheses as supplied by the user. This is the string that the user wishes to check whether or not is logical, and if it is illogical which type of parenthesis is in excess. The head is a "read-only" device which reads each symbol on the tape in consecutive order.

LOGIC COUNTER TAPE AND ITS HEAD: This tape initially has a single "0" written on it. The head for this tape is a "read and write" device. The purpose of this component is to keep track of the number of "(" that have not yet been cancelled with a corresponding ")". At all times the number of "(" which have not yet been cancelled is displayed on the tape in unary.

LOCATOR TAPE AND ITS HEAD: The locator tape is an infinite two-dimensional tape which serves as a filing cabinet. Each cell contains a <$\rho$> and frequency, f, pair of values associated with a certain combination of total inputs and total number of unpaired "(". The head is a "read-only" device which moves to different cells to find the correct <$\rho$> and frequency, f, values describing the system at a certain time. The head on this tape moves down one row for each alphabet input, and serves as a counter for the total number of inputs added up to the current time.

OUTPUT TAPE AND ITS HEAD: This tape is initially blank, and the head is a "write-only" device which writes to the tape the <$\rho$> and frequency, f, values of the system at each time. These values are provided by the LOCATOR TAPE AND ITS HEAD, which is described below.

HEAD CONTROL: this is the central unit which controls the movement of the heads in directions specified by both the state of the chemically-operated Turing machine of the embodiments of the present invention, and the stimuli the head control receives from the various tapes.

Not all the tapes are physically implemented in the chemically-operated Turing machine of the embodiments of the present invention, where they are necessary in order to have a clear logical description of the chemically-operated Turing machine of the embodiments of the present invention.

The Operation of the Previous Logical Components.

Next, a brief description is provided of the logical operation of each of the previous components.

The INPUT TAPE AND HEAD: The tape is created by the user of the chemically-operated Turing machine of the embodiments of the present invention. It contains the string of parentheses the user wishes to determine whether or not is logical. The user must end this string with an "E" printed on the tape.

The LOGIC COUNTER TAPE AND HEAD: The tape begins with all cells blank except for one which contains a "0". This tape and head will keep track of the number of unmatched "(" the chemically-operated Turing machine of the embodiments of the present invention encounters, while reading from the INPUT TAPE, by printing a 1 for each "(". The total number is written in unary. This number is decreased, by replacing one of the 1's with a "0", each time the chemically-operated Turing machine of the embodiments of the present invention reads-in an ")" that corresponds with a preceding "(".

The OUTPUT TAPE AND HEAD: The tape is initially blank. This part of the chemically-operated Turing machine of the embodiments of the present invention will record the output after each symbol is read from the INPUT TAPE. The output is a set containing some mean value of oscillation, $\rho$, and a frequency of oscillation f. These values are found on the LOCATOR TAPE, and are simply copied to the OUTPUT TAPE. An "X" may also be printed on the output tape; this signifies that the input string was illogical.

The LOCATOR TAPE AND HEAD acts as a filing cabinet which the chemically-operated Turing machine of the embodiments of the present invention pulls from. This is a two dimensional tape which contains pairs that specify a certain mean oscillation value, $\rho$, and a frequency of oscillation f. These values are unique to the input read-in by the chemically-operated Turing machine of the embodiments of the present invention up to any point in time. The head of the chemically-operated Turing machine of the embodiments of the present invention moves down one cell each time an input is read-in. Additionally, the head moves right one cell if an "(" was read from the INPUT TAPE, and one cell left if an ")" was read-in.

The vertical movement of the head on the locator tape counts the total number of inputs. The left and right movements place the head over a certain set, $\{\rho, f\}$, corresponding to a certain number of open parentheses and a certain number of closed parentheses that have been read-in by the chemically-operated Turing machine of the embodiments of the present invention.

The LOCATOR HEAD begins in the (0,0) entry of this tape, corresponding to no inputs being read from the INPUT TAPE. The column associated with this cell contains all the sets, $\{\rho^*, f^*\}$, that correspond to an equal number of open and closed parentheses being read-in by the chemically-operated Turing machine of the embodiments of the present invention up to a certain time.

At any point in time after some input has been read-in, the number of cells away from the zero column that the head is exactly equal to the number written in unary on the LOGIC COUNTER TAPE.

The column of B's represents the cells the head will reach only if an excess of closed parentheses have been read-in, thus the string of parentheses is illogical. If the head finds a "B" in the cell it moves to, the chemically-operated Turing machine of the embodiments of the present invention halts and declares the Input "illogical".

Blank cells on this tape represent cells that the head will never move to because their location corresponds to an impossible total counter and logic counter combination.

The States of the Finite State Machine that Make it Equivalent to the Chemistry

The five states of the chemically operated Turing machine of the embodiments of the present invention are as follows:

STATE-I (Initial): This is the first state the machine enters upon starting. It immediately filters out strings of parentheses that begin illogically (e.g., begin with ")") by sending them to state Q2 and labeling them as "illogical". If the string begins with "(" the chemically operated Turing machine of the embodiments of the present invention moves on to state Q1.

STATE-Q1: This state instructs the head control to move the head on the logic counter tape one cell to the right, and the head on the locator tape one cell down, and one cell to the right. In this state the machine only responds to a stimulus from the locator tape. The response to this stimulus has two parts. The first part is that the corresponding $<\rho>$ and frequency, f, pair (as provided by the locator tape) is printed on the output tape. The second part is that a "1" is printed on the logic counter tape. Note that the machine can only move to state Q3 from this state.

STATE-Q2: The machine only moves to this state if the first symbol on the Input Tape happens to be ")". This state instructs the head control to move the head on the locator tape one cell down and one cell to the left. The head on the locator tape will then encounter a "B" written in this cell. This will cause the machine to print an "X" in the current cell on the output tape and to halt. The "X" indicates that the input string was illogical.

STATE-Q3: In this state the head control will move the heads on input and output tapes one cell to the right. In this state, the machine only responds to a stimulus from the input tape. If the stimulus is "(" the machine moves to state Q1. On the other hand, if the stimulus is ")" the machine moves on to state Q4 and the response is a "0" printed on the logic counter tape. If the logic counter tape had any 1's on the tape, this "0" will replace one of them. If the stimulus is "E" the machine moves on to state Q5.

STATE-Q4: In this state the head control moves the head of the logic counter one cell to the left, and the head on the locator tape one cell down and one cell to the left. Note that when in this state the machine only responds to a Stimulus from the locator tape. If the stimulus is a "B" the machine prints an "X" on the output tape and halts. If the stimulus is a pair of $<\rho>$ and frequency, f, from the locator tape, then the response is to print this pair on the output tape, and the machine moves on to state Q3.

STATE-Q5: In this state no heads move. The stimuli come as pairs: one part from the logic counter tape and the other from the locator tape. The part of the stimulus which comes from the locator tape may be a specific $<\rho>$ and frequency, f, pair. The part of the stimulus from the logic counter tape may either be a "1" or "0". If "0", the machine prints the current $<\rho>$ and frequency, f, of the system on the output tape; this signals that the string is logical and has matched parentheses. If "1", then the machine prints an "X" on the output tape (the string is illogical because at least one "(" remained unmatched).

The Nomograph

For the example of the parenthesis matching using the chemically-operated Turing machine of the embodiments of the present invention, the nomograph translates the machine's computations (oscillatory properties consisting of the frequency of the chemical oscillations and the average value of ρ) into one of the following four possibilities: "Yes, the Result is that the parenthesis match"; "No, the expression entered has too many open parentheses"; "No, the expression entered has too many closed parentheses"; or "No, the expression entered is illogical."

Given a set of chemical parameters for the B/Z reaction used in the chemically-operated Turing machine of the embodiments of the present invention, the nomograph can be constructed and be used to interpret any calculation carried out by any instances of this machine. The nomograph is equivalent to a calibration curve or reference curve for the reaction and for the problem at hand solved by the chemically-operated Turing machine of the embodiments of the present invention. Therefore, given a set of reaction conditions (e.g., reactant concentration; first chemical species concentration; and second chemical species concentration), the same Nomograph must be used for all the computations. However, if the reaction conditions are modified, for example, if the size or concentration of the drops used as the input alphabet is changed, then the chemical machine may need recalibration and a new nomograph may be necessary. The same applies if the underlying chemical reaction was not the B/Z system and a different chemistry was involved.

The nomograph is a step-curve that displays the mean of oscillations only for the case of matched (or cancelling) pairs of parentheses. More specifically, it is constructed so that it satisfies the following:

an expression with matched parentheses ends with the response printed exactly on the nomograph line in the last computed cell of the output tape;

an expression with excess open parentheses ends with the response printed above the nomograph line in the last computed cell other output tape;

an expression with excess closed parentheses ends with the response printed below the nomograph line in the last computed cell of the output tape;

an illogical expression may result in a response printed below the nomograph at the corresponding step where the expression became illogical;

for an odd number of input parentheses the response is going to lie either above or below the nomograph line (excess of open or closed parentheses, respectively); and only when in configurations where there is not any excess of either open or closed parentheses does the response of the chemical system lie precisely on the nomograph curve.

Example 1 of Actual Operation

Checking the Parenthesis String "( )( )"

First, the string that is to be checked is written, beforehand, on the input tape. Additionally, an "E" is written on this tape immediately after the last parenthesis in the string. This will indicate to the machine the end of the string. See FIG. 5A.

The chemically-operated Turing machine of the embodiments of the present invention starts in state (I), where the first parenthesis is read from the input tape. The first parenthesis is open "(." At this point, a volume of bromate ions is added. The machine moves to state (Q1). As a result the head on the logic counter tape moves right one cell and the head on the locator tape moves down one cell and right one cell.

The chemically-operated Turing machine of the embodiments of the present invention is now in state (Q1). The head on the locator tape reads, from the cell it is currently on, its mean oscillation value, $<\rho>$ and the oscillation frequency, f. This causes the chemically-operated Turing machine of the embodiments of the present invention to move to state (Q3). The pair of numbers from the locator tape is printed in one cell of the output tape. Also, a "1" is printed on the logic counter tape. In addition, the heads of both the input tape and the output tape move one cell to the right.

The mean oscillation value $<\rho>$ and frequency that were written on the output tape, or equivalently, copied from the locator tape, are 1 and 0, respectively, since only one type of symbol has been read by the machine.

The chemically-operated Turing machine of the embodiments of the present invention is now in state (Q3). The next input is read from the input tape. In this case the input is a closed parenthesis ")". See FIG. 5B. A volume of malonic acid is added. This causes the chemically-operated Turing machine of the embodiments of the present invention to move to state (Q4). A "0" is printed on the logic counter tape, replacing the "1" that was printed previously. Then the head on the logic counter tape moves one cell to the left, and the head on the locator tape moves one cell down, and one cell to the left.

The length of time between the two inputs, "(" and ")" should be long enough so as to guarantee that the chemical reaction has reached steady state for that particular configuration.

The chemically-operated Turing machine of the embodiments of the present invention is in state (Q4). The head on the locator tape reads, from the cell it is currently on, its mean oscillation value, <ρ> and the oscillation frequency, f. This causes the machine to move to state (Q3). The pair of numbers from the locator tape is printed in one cell of the output tape. The heads of both the input tape and output tape move one cell to the right.

The frequency that was written on the output tape, or equivalently, copied from the locator tape is, at this point, non-zero since both types of inputs have been read from the input tape. The mean oscillation value <ρ> lies on the nomograph, since exactly one of each type of input has been added. See FIG. 6.

The chemically-operated Turing machine of the embodiments of the present invention is in state (Q3). The next input is read from the input tape. In this case the input is "(" (i.e., a volume of bromate ions is added). This causes the chemically-operated Turing machine of the embodiments of the present invention to move to state (Q1). The head on the logic counter tape moves one cell to the right, and the head on the locator tape moves one cell down, and one cell to the right.

The chemically-operated Turing machine of the embodiments of the present invention is in state (Q1). The head on the locator tape reads, from the cell it is currently on, its mean oscillation value, <ρ> and the oscillation frequency, f. This causes the chemically-operated Turing machine of the embodiments of the present invention to move to state (Q3). The pair of numbers from the locator tape is printed in the current cell of the output tape. Also, a "1" is printed on the logic counter tape. In addition, the heads of both the input tape and output tape move one cell to the right.

The frequency has increased. The mean oscillation value lies above the nomograph, since at this point more "(" have been read from the input tape, than ")".

The chemically-operated Turing machine of the embodiments of the present invention is in state (Q3). The next input is read from the input tape. In this case, the input is a closed parenthesis ")" (i.e., a volume of malonic acid is added). This causes the machine to move to state (Q4). A "0" is printed on the logic counter tape, replacing the "1" that was printed previously. Then, the head on the logic counter tape moves one cell to the left, and the head on the locator tape moves one cell down, and one cell to the left.

The chemically-operated Turing machine of the embodiments of the present invention is in state (Q4), the head on the locator tape reads, from the cell it is currently on, its mean oscillation value, <ρ>, and the oscillation frequency f. This causes the chemically-operated Turing machine of the embodiments of the present invention to move to state (Q3). The pair of numbers from the locator tape are printed in one cell of the output tape. The heads of both the input tape and output tape move one cell to the right.

Once again, the frequency has increased. The mean oscillation value now lies on the nomograph, since at this point two of each type of input, that is two "(" and two ")," have been read from the input tape.

The chemically-operated Turing machine of the embodiments of the present invention is in state (Q3). The next input is read from the input tape. In this case the input is "E". This signals the end of the parenthesis string and causes the machine to move to state (Q5). Nothing is printed on any tapes, nor do any heads move during the transition to state (Q5).

The chemically-operated Turing machine of the embodiments of the present invention is in state (Q5). The head on the logic counter tape reads the symbol printed in the cell it is currently on, and the head on the locator tape reads, from the cell it is currently on, its mean oscillation value, <ρ> and the oscillation frequency, f. The symbol read from the logic counter tape is "0" in this case. This will cause the chemically-operated Turing machine of the embodiments of the present invention to print, on the output tape, the set of numbers copied from the locator tape. Then, chemically-operated Turing machine of the embodiments of the present invention will halt.

At this point, the frequency and mean oscillation value remain unchanged since no additional input has been introduced into the chemical system.

The chemically-operated Turing machine of the embodiments of the present invention has halted. The output tape contains only a list of pairs which were copied from the locator tape. The fact that no "X" is printed on the output tape indicates that the string of parentheses on the input tape is "logical." Also, the last two cells of the output tape contain the same pair of numbers. This shows that since no more open or closed parentheses were read from the input tape, the mean oscillation value, and frequency, should remain unchanged.

Since the frequency is non-zero, and the mean oscillation value lies exactly on the nomograph in the last cell and at no point in time fell below the nomograph line, this indicates that the input string of parentheses was "logical."

Figure 6:
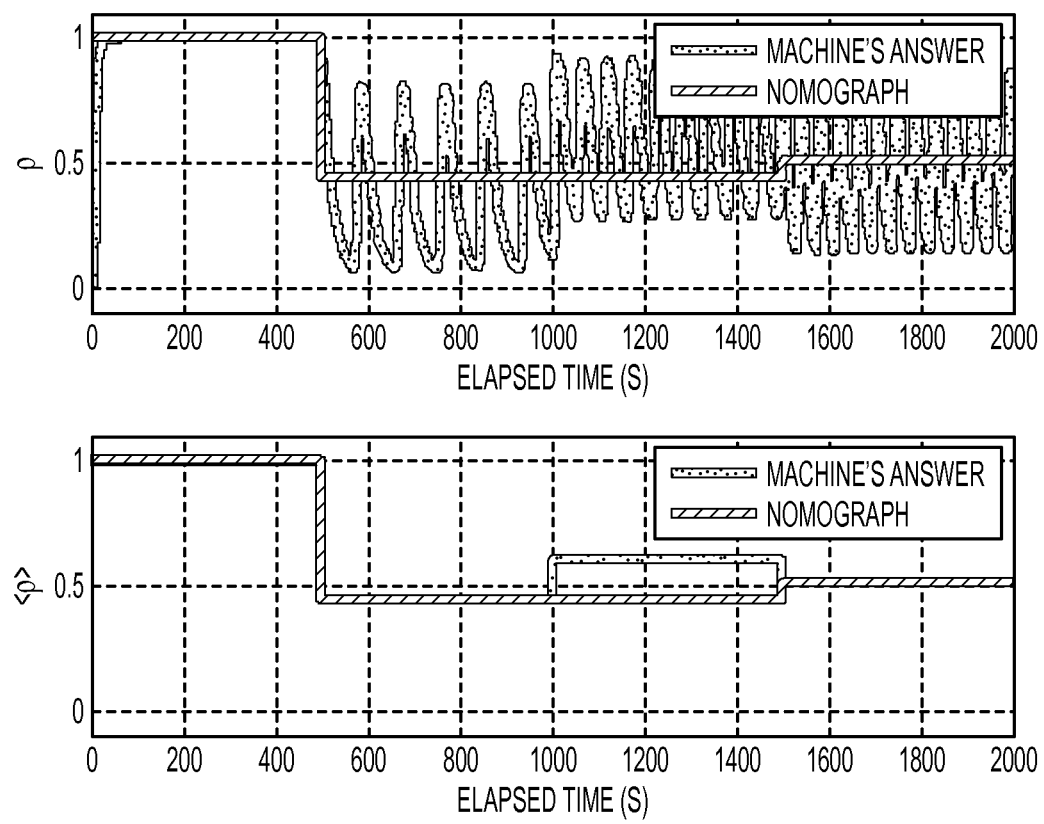
FIGS. 6 and 7 are nomographs.

The nomograph for the string "( )( )" is shown in FIG. 6. The nomograph is a pre-calibrated graph against which one compares the results of the nomograph computation taking place and the results being interpreted. The graph represents both the oscillations in <ρ> and their average value as a function of time as one adds a selected sequence of parenthesis to the FSM.

Example 2 of Actual Operation

Checking the Parenthesis String "( )(("

First, the string that is to be checked is written, beforehand, on the input tape. Additionally, an "E" is written on this tape immediately after the last parenthesis in the string. This will indicate to chemically-operated Turing machine of the embodiments of the present invention the end of the string.

The chemically-operated Turing machine of the embodiments of the present invention starts in state (I), where the first parenthesis is read from the input tape. The first parenthesis is open "("; therefore, the chemically-operated Turing machine of the embodiments of the present invention moves to state (Q1). As a result the head on the logic counter tape moves right one cell and the head on the locator tape moves down one cell and right one cell.

The chemically-operated Turing machine of the embodiments of the present invention is in state (Q1). The head on the locator tape reads, from the cell it is currently on, its mean oscillation value, <ρ> and the oscillation frequency, f. This causes the chemically-operated Turing machine of the embodiments of the present invention to move to state (Q3). The pair of numbers from the locator tape is printed in one cell of the output tape. Also, a "1" is printed on the logic counter tape. In addition, the heads of both the input tape and the output tape move one cell to the right.

The mean oscillation value <ρ> and frequency that were written on the output tape, or equivalently, copied from the locator tape, are 1 and 0, respectively, since only one type of symbol has been read by the chemically-operated Turing machine of the embodiments of the present invention.

The chemically-operated Turing machine of the embodiments of the present invention is in state (Q3). The next input is read from the input tape. In this case the input is a closed parenthesis ")". This causes the chemically-operated Turing machine of the embodiments of the present invention to move to state (Q4). A "0" is printed on the logic counter tape, replacing the "1" that was printed previously. Then the head on the logic counter tape moves one cell to the left, and the head on the locator tape moves one cell down, and one cell to the left.

The chemically-operated Turing machine of the embodiments of the present invention is in state (Q4). The head on the locator tape reads, from the cell it is currently on, its mean oscillation value, <ρ> and the oscillation frequency, f. This causes chemically-operated Turing machine of the embodiments of the present invention to move to state (Q3). The pair of numbers from the locator tape is printed in one cell of the output tape. The heads of both the input tape and output tape move one cell to the right.

The frequency that was written on the output tape, or equivalently, copied from the locator tape is, at this point, non-zero since both types of inputs have been read from the input tape. The mean oscillation value <ρ> lies on the nomograph, since exactly one of each type of input has been added. See FIG. 7.

The chemically-operated Turing machine of the embodiments of the present invention is in state (Q3). The next input is read from the input tape. In this case the input is "(". This causes the chemically-operated Turing machine of the embodiments of the present invention to move to state (Q1). The head on the logic counter tape moves one cell to the right, and the head on the locator tape moves one cell down, and one cell to the right.

The chemically-operated Turing machine of the embodiments of the present invention is in state (Q1). The head on the locator tape reads, from the cell it is currently on, its mean oscillation value, <ρ> and the oscillation frequency, f. This causes the chemically-operated Turing machine of the embodiments of the present invention to move to state (Q3). The pair of numbers from the locator tape is printed in the current cell of the output tape. Also, a "1" is printed on the logic counter tape. In addition, the heads of both the input tape and output tape move one cell to the right.

The frequency has increased. The mean oscillation value lies above the nomograph, since at this point more "(" have been read from the input tape, than ")".

The chemically-operated Turing machine of the embodiments of the present invention is in state (Q3). The next input is read from the input tape. In this case the input is an open parenthesis "(". This causes the machine to move to state (Q1). The head on the logic counter tape moves one cell to the right, and the head on the locator tape moves one cell down, and one cell to the right.

The chemically-operated Turing machine of the embodiments of the present invention is in state (Q1). The head on the locator tape reads, from the cell it is currently on, its mean oscillation value, <ρ> and the oscillation frequency, f. This causes the machine to move to state (Q3). The set of numbers from the locator tape are printed in one cell of the output tape. Also, a "1" is printed on the logic counter tape. In addition, the heads of both the input tape and output tape move one cell to the right.

The frequency has increased. The mean oscillation value lies even further above the nomograph, since at this point two excess "(" have been read from the input tape.

The chemically-operated Turing machine of the embodiments of the present invention is in state (Q3). The next input is read from the input tape. In this case the input is "E". This signals the end of the parenthesis string and causes the machine to move to state (Q5). Nothing is printed on any tapes, nor do any heads move during the transition to state (Q5).

The chemically-operated Turing machine of the embodiments of the present invention is in state (Q5). The head on the logic counter tape reads the symbol printed in the cell it is currently on, and the head on the locator tape reads, from the cell it is currently on, its mean oscillation value, <ρ> and the oscillation frequency, f. The symbol read from the logic counter tape is "1" in this case. This will cause the output tape head to print an "X" on the output tape. Then the chemically-operated Turing machine of the embodiments of the present invention will halt.

The frequency and mean oscillation value remain unchanged since no additional input has been introduced into the system.

The chemically-operated Turing machine of the embodiments of the present invention has halted. The output tape contains the list of pairs copied from the locator tape. However, in the last cell printed there is an "X". This indicates that the string of parentheses on the input tape is "illogical." Further, the fact that a "1" was read from the logic counter tape indicates that the string of parentheses contained too many open parentheses. After processing the entire string, there remained open parentheses that had not been "cancelled" or "matched" with closed parentheses.

The mean oscillation value lies above the nomograph in the last cell. This indicates an excess of "(" in the input string. Therefore, the string is "illogical."

In the examples given above, the chemically-operated Turing machine of the embodiments of the present invention comprises a reactor that is operated in a semibatch format, with some discrete feeds of the first and second chemical species that make up the input tape added at constant time steps and no outflows from the reactor. In some embodiments, the chemically-operated Turing machine of the embodiments of the present invention can be modified such that the reactor operates as a CSTR, with continuous feed and outflow. In this case, the input string to be computed is represented as step changes of either of the two added species (i.e., the first and second chemical species) to represent "(" and ")" at fixed time intervals (longer than the residence time in the reactor).

Figure 7:
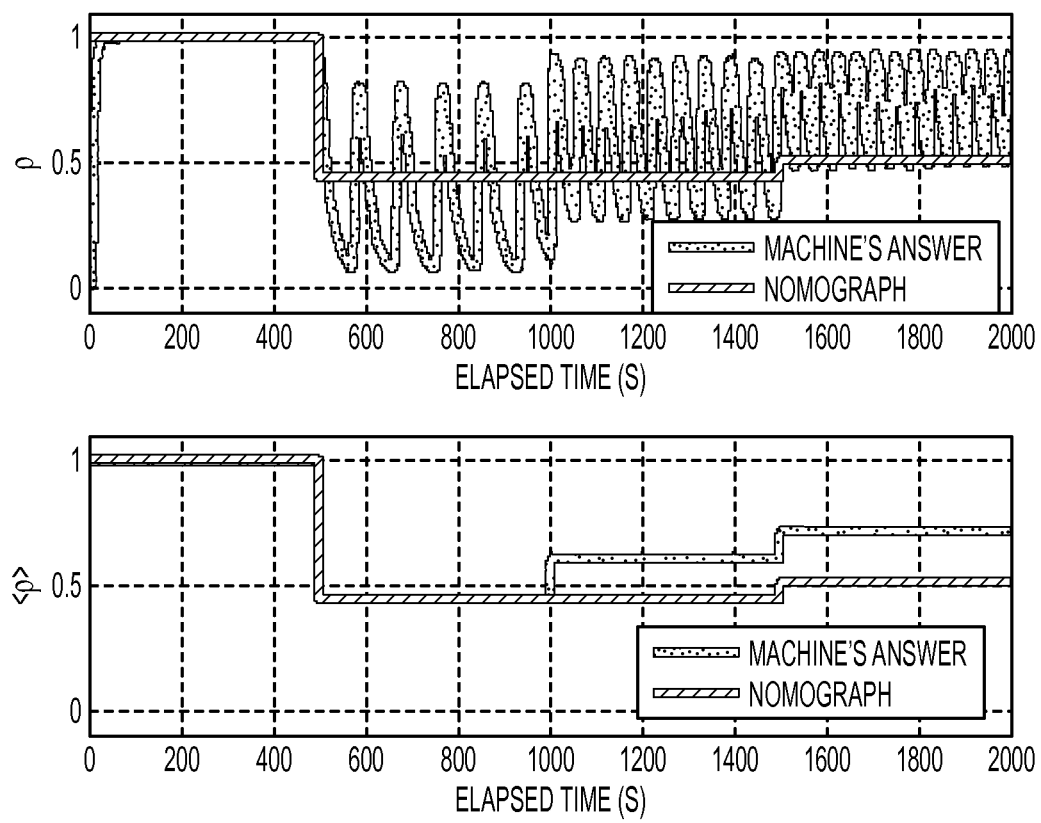

The nomograph for the string "( )((" is shown in FIG. 7.

Although the examples given above rely on chemically-operated Turing machine using the oscillatory regime of the B/Z reaction, other chemically-operated Turing machines of the embodiments of the present invention are contemplated that rely on both the oscillatory and steady-state regimes of the B/Z reaction.

Finally although the examples given above, present the chemically-operated Turing machine of the embodiments of the present invention as a parentheses checker, which is but one example, those of skill in the art could expect to construct any chemically-operated Turing machine, even universal chemical Turing machines, using the teachings of the instant disclosure.

Embodiments of the invention described and claimed herein are not to be limited in scope by the specific embodiments herein disclosed, since these embodiments are intended as illustration of several aspects of the disclosure. Any equivalent embodiments are intended to be within the scope of this disclosure. Indeed, various modifications of the embodiments in addition to those shown and described herein will become apparent to those skilled in the art from the foregoing description. Such modifications are also intended to fall within the scope of the appended claims.

All publications, including non-patent literature (e.g., scientific journal articles), patent application publications, and patents mentioned in this specification incorporated by reference as if each individual patent application publications, and patents were specifically and individually indicated to be incorporated by reference.

What is claimed is:

1. A Turing machine based on a non-linear oscillatory chemical reaction comprising:
   an input source to provide a sequence of data to feed a chemical reactor comprising a reactant solution comprising a reactant capable of attaining multiple states when a first chemical species or a second chemical species are added to the chemical reactor, the sequence of data consisting of symbols from a two symbol chemical alphabet;
   a first chemical species source to provide a selected amount of a first chemical species to the chemical reactor comprising the reactant solution comprising the reactant, the first chemical species corresponding to a first symbol in the two symbol chemical alphabet;
   a second chemical species source to provide a selected amount of a second chemical species to the chemical reactor comprising the reactant solution comprising the reactant, the second chemical species corresponding to a second symbol in the two symbol chemical alphabet;
   one or more external controllers communicatively coupled to the first chemical species source and the second chemical species source;
   the one or more external controllers adapted to receive the sequence of data from the input tape, and control the addition, to the chemical reactor comprising the reactant solution comprising the reactant, of the first and second chemical species from the first or the second chemical species sources corresponding to the sequence of data; and
   one or more external sensors to sense a change of the state of the reactant corresponding to one of the multiple states attainable by the reactant as the above one or more external controllers operate the sources of the first and second chemical species to add selected amounts of the respective first and second chemical species to the chemical reactor to represent the input sequence of data and to correlate the subsequent state of the reactant to a chemical result that is chemically and autonomously computed in the chemical reactor and which depends on the sequence of chemical species in the input source; and
   an external computer system including an interface communicatively coupled to the one or more external sensors to allow a user to understand the chemical result chemically and autonomously computed as a function of the sequence input source by:
   receiving from the one or more external sensor signals representative of amplitude and frequency of oscillations of the non-linear oscillatory chemical reaction;
   correlating the amplitude and frequency signals with the state of the chemical reaction;
   processing the information on the state of the chemical reaction into a logical result; and
   outputting the logical result.

2. The Turing machine of claim 1, wherein the one or more sensors comprises a redox sensor, a pH sensor, a temperature sensor, a pressure sensor, a UV-Vis sensor or combinations thereof.

3. The Turing machine of claim 1, wherein the first chemical species comprises a reducing agent solution and the second chemical species comprises an oxidizing agent solution.

4. The Turing machine of claim 3, wherein the reducing agent comprises malonic acid.

5. The Turing machine of claim 3, wherein the oxidizing agent comprises bromate ions.

6. The Turing machine of claim 1, wherein the reactor is a continuously stirred tank reactor.

7. The Turing machine of claim 1, wherein the reactant solution is a transition metal complex solution and the Turing machine comprises a sensor comprising a spectrometer adapted to periodically detect color changes in the transition metal complex solution.

8. The Turing machine of claim 1, wherein the first chemical species source and/or the second chemical species source comprise burettes.

9. The Turing machine of claim 1, wherein the states of the reactant comprise meta stable states.

10. The Turing machine of claim 1, wherein the reactant solution comprises a transition metal complex.

11. The Turing machine of claim 10, wherein the transition metal complex comprises a ruthenium (II) complex, a ruthenium (III) complex, cerium (III) or a cerium (IV) complex.

12. The Turing machine of claim 11, wherein the ruthenium (II) complex is a tris(bipyridine)ruthenium (II) complex.

13. The Turing machine of claim 1, wherein the input comprises a parenthesis.

14. The Turing machine of claim 1, wherein said Turing machine is a parenthesis checker.

15. A central processing unit of a programmable chemical computer comprising one or more Turing Machines of claim 1.

16. A programmable chemical computer comprising a central processing unit which comprises one or more Turing Machines of claim 1.

17. A method of operating the Turing machine of claim 1, the method comprising:
   providing an input tape to the Turing machine, the input comprising an ordered input sequence of data consisting of symbols from a two symbol chemical alphabet;
   sensing a change of the state of the reactant corresponding to one of the multiple states attainable by the reactant;
   causing the one or more external controllers to provide a selected amount of the first chemical species to the chemical reactor in response to a first symbol in the two symbol chemical alphabet;
   causing the one or more external controllers to provide a selected amount of the second chemical species to the chemical reactor in response to a second symbol in the two symbol chemical alphabet;

to represent the input sequence of data and to correlate the subsequent state of the reactant to a chemical result that is chemically and autonomously computed in the chemical reactor and which depends on the sequence of chemical species in the input source; and allowing a user to understand the chemical result chemically and autonomously computed as a function of the input source by means of a computer system including an interface communicatively coupled to the one or more external sensors which:

receives from the one or more external sensors signals representative of amplitude and frequency of the oscillations of the non-linear oscillatory chemical reaction;

correlates amplitude and frequency with the state of the chemical reaction;

processes information on the state of the chemical reaction into a logical result; and outputs the logical result.

18. A Turing machine based on a non-linear oscillatory chemical reaction comprising:

an input source to provide a sequence of data to feed a finite state machine, the sequence of data consisting of symbols from a two symbol chemical alphabet;

a first chemical species source coupled to a chemical reactor to provide a selected amount of a first chemical species to the finite state machine, the first chemical species corresponding to a first symbol in the two symbol chemical alphabet;

a second chemical species source coupled to the chemical reactor to provide a selected amount of a second chemical species to the finite state machine, the second chemical species corresponding to a second symbol in the two symbol chemical alphabet;

one or more external controllers communicatively coupled to the input source, the first chemical species source and the second chemical species source, the one or more external controllers configured to process the sequence of data received from the input source to operate the sources of the first chemical species and the second chemical species;

the finite state machine including:

the chemical reactor including a reactant solution comprising a reactant capable of attaining multiple states when a first chemical species or a second chemical species are added to the chemical reactor; and a monitoring system including:

one or more external sensors, the one or more external sensors adapted to produce signals indicative of changes of the state of the reactant as the above one or more external controllers operate sources of the first and second chemical species to add selected amounts of the respective first and second chemical species to the chemical reactor;

a display device to visually display output of the Turing machine; and a computing device coupled to the one or more external sensors and the display device, the computing device allowing a user to understand the chemical result chemically and autonomously computed as a function of the sequence input source by:

receiving from the one or more external sensor signals representative of relationship between amplitude and frequency of oscillations of the non-linear oscillatory chemical reaction;

correlating the amplitude and frequency with the state of the chemical reaction;

processing the information on the state of the chemical reaction into a logical result; and outputting the logical result.

* * * * *